US011414132B2

(12) United States Patent
Ebisumoto et al.

(10) Patent No.: US 11,414,132 B2
(45) Date of Patent: Aug. 16, 2022

(54) VEHICLE BODY STRUCTURE FOR VEHICLE, AND MANUFACTURING METHOD OF VEHICLE

(71) Applicant: MAZDA MOTOR CORPORATION, Hiroshima (JP)

(72) Inventors: Keisuke Ebisumoto, Aki-gun (JP); Tadashi Yamazaki, Aki-gun (JP); Yuki Kataoka, Aki-gun (JP); Manabu Tatsuda, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 68 days.

(21) Appl. No.: 17/024,478

(22) Filed: Sep. 17, 2020

(65) Prior Publication Data

US 2021/0094618 A1 Apr. 1, 2021

(30) Foreign Application Priority Data

Sep. 27, 2019 (JP) .............................. JP2019-176443

(51) Int. Cl.
*B62D 25/02* (2006.01)
*B62D 25/20* (2006.01)
*B62D 27/02* (2006.01)
*B62D 25/04* (2006.01)

(52) U.S. Cl.
CPC ....... *B62D 25/025* (2013.01); *B62D 25/2009* (2013.01); *B62D 27/026* (2013.01); *B62D 25/04* (2013.01); *B62D 25/20* (2013.01)

(58) Field of Classification Search
CPC .............. B62D 25/025; B62D 25/2009; B62D 27/026; B62D 25/04; B62D 25/20

USPC .......................................................... 296/209
See application file for complete search history.

(56) References Cited

U.S. PATENT DOCUMENTS 8,708,390 B2 * 4/2014 Kurogi ................... B62D 25/02
                                                                       296/30
9,963,172 B2 * 5/2018 Iyoshi ................... B62D 27/023

FOREIGN PATENT DOCUMENTS

JP            2019-055669 A      4/2019

* cited by examiner

*Primary Examiner* — D Glenn Dayoan
*Assistant Examiner* — Dana D Ivey
(74) *Attorney, Agent, or Firm* — Studebaker & Brackett PC

(57) ABSTRACT

A vehicle body structure includes a side sill having a closed cross-section portion, and a reinforcement body inside the closed cross-section portion and joined to the side sill. The reinforcement body comprises first and second reinforcement portions. The first reinforcement portion has a first bonding surface on the upper side and is joined to an inner wall of the closed cross-section portion at a portion other than the first bonding surface, and the second reinforcement portion has a second bonding surface facing the first bonding surface from above the first bonding surface, and is joined to the inner wall at a portion other than the second bonding surface. The first and second bonding surfaces are bonded together through a damping member made of an adhesive material. The first and second bonding surfaces are disposed at an inclination angle of 30 degrees or less with respect to a horizontal plane.

8 Claims, 17 Drawing Sheets

VEHICLE BODY STRUCTURE FOR VEHICLE, AND MANUFACTURING METHOD OF VEHICLE

BACKGROUND

Technical Field

The present disclosure relates to a vehicle body structure for a vehicle having a joint member provided in a closed cross-section portion of a frame, and a manufacturing method of a vehicle having the vehicle body structure.

Background Art

Conventionally, in a vehicle body structure for a vehicle such as an automobile, a frame having a hollow structure has been adopted to reduce the weight of a vehicle body, and a structure has been known in which a joint member that partitions a closed cross-section portion of a frame is further provided as a reinforcement member inside the closed cross-section portion to improve the rigidity of the frame.

Furthermore, in order to reduce the transmission of vibration to the inside of the vehicle body via the joint member, among the portions to be joined to an inner wall of the closed cross-section portion of the joint member, a vertical wall portion standing in a perpendicular direction to the joint member is joined to the inner wall through a damping member such as a damping bond as in the vehicle body structure described in Japanese Unexamined Patent Publication No. 2019-055669.

In this vehicle body structure, unevenness is provided on the vertical wall portion and the inner wall of the closed cross-section portion to prevent dripping of the damping bond.

SUMMARY

In recent years, a structure using a joint member divided into two component parts (or three or a larger number of components parts) has been adopted for various reasons such as improving the assembling performance of the joint member. For example, when the joint member is composed of two divided parts in a perpendicular direction, opposing surfaces of the two divided parts extend in the perpendicular direction. Therefore, in order to reduce the transmission of vibration between the two divided parts, it is necessary to apply a damping bond to the opposing surfaces. In this case, after applying the damping bond to the surface of one of the divided parts of the joint member, when performing a work for holding the damping bond between the opposing surfaces of the two parts by bringing the other part closer to the one part, there is a possibility that the damping bond may drip before being cured and a predetermined damping performance may not be ensured.

The present disclosure has been made in view of the above circumstance, and thus provides a vehicle body structure for a vehicle that can prevent dripping of a damping member between the opposing surfaces of a reinforcement member having a divided structure.

Accordingly, a vehicle body structure for a vehicle of the present disclosure includes a frame that constitutes a vehicle body and has a closed cross-section portion; and a reinforcement body disposed inside the closed cross-section portion and joined to the frame. The reinforcement body is composed of a first reinforcement portion and a second reinforcement portion. The first reinforcement portion has a first bonding surface on an upper side and is joined to an inner wall of the closed cross-section portion at a portion other than the first bonding surface. The second reinforcement portion has a second bonding surface facing the first bonding surface from above the first bonding surface and is joined to the inner wall of the closed cross-section portion at a portion other than the second bonding surface. The first bonding surface and the second bonding surface are bonded together through a damping member made of an adhesive material, and the first bonding surface and the second bonding surface are disposed at an inclination angle of 30 degrees or less with respect to a horizontal plane.

In this configuration, by disposing the reinforcement body inside the closed cross-section portion of the frame, the reinforcement body reinforces the frame. The reinforcement body has a divided configuration composed of the first reinforcement portion and the second reinforcement portion, and the mutually facing first bonding surface and second bonding surface of the first reinforcement portion and the second reinforcement portion are bonded together through the damping member made of an adhesive material, and therefore vibration transmitted to the reinforcement body can be damped by the damping member. In such a structure, since the first bonding surface and the second bonding surface are disposed at an inclination angle of 30 degrees or less with respect to the horizontal plane, it is possible to prevent dripping of the damping member from the first bonding surface before being cured. As a result, it is possible to prevent dripping of the damping member between the opposing surfaces of the reinforcement body having the divided structure, and the damping member can exhibit a predetermined damping performance.

In the vehicle body structure for a vehicle, the first bonding surface and the second bonding surface are preferably inclined surfaces rising toward an inner side in a vehicle-width-direction of the frame.

According to this configuration, when the damping member is applied to the first bonding surface before joining the first bonding surface and the second bonding surface together, the tip of a device for applying the damping member can be inserted into a portion of the frame on the inner side in the vehicle width direction without interference. Moreover, it is possible to place the second bonding surface to face the first bonding surface and join the second bonding surface to the first bonding surface without dropping the damping member applied to the first bonding surface when joining the second bonding surface to the first bonding surface.

In the vehicle body structure for a vehicle, it is preferred that the frame have a side sill having the closed cross-section portion and extending in a vehicle front-rear direction along a side portion of a vehicle floor; and the cross member extending in the vehicle width direction and joined to the side sill at an end in the vehicle width direction, the reinforcement body be disposed at a position aligned with the cross member in the vehicle width direction inside the closed cross-section portion of the side sill, and ridge portions extending in the vehicle width direction be formed by providing vertical walls on side edges of the mutually facing first bonding surface and second bonding surface.

According to this configuration, a collision load input to the side sill during a side collision of the vehicle (collision on a vehicle side surface) can be transmitted to the cross member via the ridge portions extending in the vehicle width direction, which are formed by providing the vertical walls on the side edges of the mutually facing first bonding surface and second bonding surface of the reinforcement body. As a result, deformation and damage of the side sill can be reduced.

In the vehicle body structure for a vehicle, in a front view of the vehicle, the first bonding surface and the second bonding surface are preferably disposed so that an extension line extending between the first bonding surface and the second bonding surface to the vehicle-width-direction inner side intersects the side sill at an intermediate position or a higher position in a height direction of a side surface of the side sill on the vehicle-width-direction inner side.

According to this configuration, during a side collision of the vehicle, the edges of the first bonding surface and the second bonding surface on the vehicle-width-direction inner side abut on the cross member at an intermediate position or a higher position in the height direction of the side surface of the side sill on the vehicle-width-direction inner side. Consequently, since the ridge portions formed on the side edges of the first bonding surface and the second bonding surface function as a support, it is possible to reduce inward falling deformation of the side sill.

A manufacturing method of a vehicle of the present disclosure is a manufacturing method of a vehicle having the vehicle body structure. The method includes a frame preparation step for preparing the frame composed of an inner portion disposed on the inner side in the vehicle width direction and an outer portion disposed on the outer side in the vehicle width direction, and divided into the inner portion and the outer portion; a damping member application step for applying the damping member to the first bonding surface in a state in which the first reinforcement portion is joined to the inner wall of the inner portion of the frame; a bonding step for bonding the second bonding surface to the first bonding surface through the damping member by bringing the second bonding surface closer to the first bonding surface while placing the second bonding surface to face the first bonding surface in a state in which the second reinforcement portion is joined to the inner wall of the outer portion of the frame; and a frame formation step for forming the frame by joining the inner portion and the outer portion together.

According to this manufacturing method, in the bonding step, the second bonding surface is bonded to the first bonding surface through the dumping member by bringing the second bonding surface closer to the first bonding surface while placing the second bonding surface to face the first bonding surface. Consequently, since the second bonding surface does not push the damping member along the first bonding surface, it is possible to manufacture the vehicle without dropping the damping member from the first bonding surface, and it is possible to ensure a predetermined damping performance of the damping member.

According to the vehicle body structure for a vehicle of the present disclosure, it is possible to prevent dripping of the damping member between the opposing surfaces of the joint member having the divided structure.

According to the manufacturing method of a vehicle of the present disclosure, it is possible to prevent dropping of the damping member between the opposing surfaces of the joint member having the divided structure.

DETAILED DESCRIPTION

Hereinafter, a preferred embodiment of the present disclosure will be described in detail with reference to the attached drawings.

A vehicle body structure for a vehicle according to the embodiment of the present disclosure shown in FIGS. 1 to 5 is a structure applied to a vehicle body 1 of an automobile or the like. This vehicle body structure includes a hollow frame 2 constituting the vehicle body 1, a reinforcement body 3 for reinforcing the frame 2, and a floor panel 4 covering a bottom portion of the frame 2.

Figure 1:
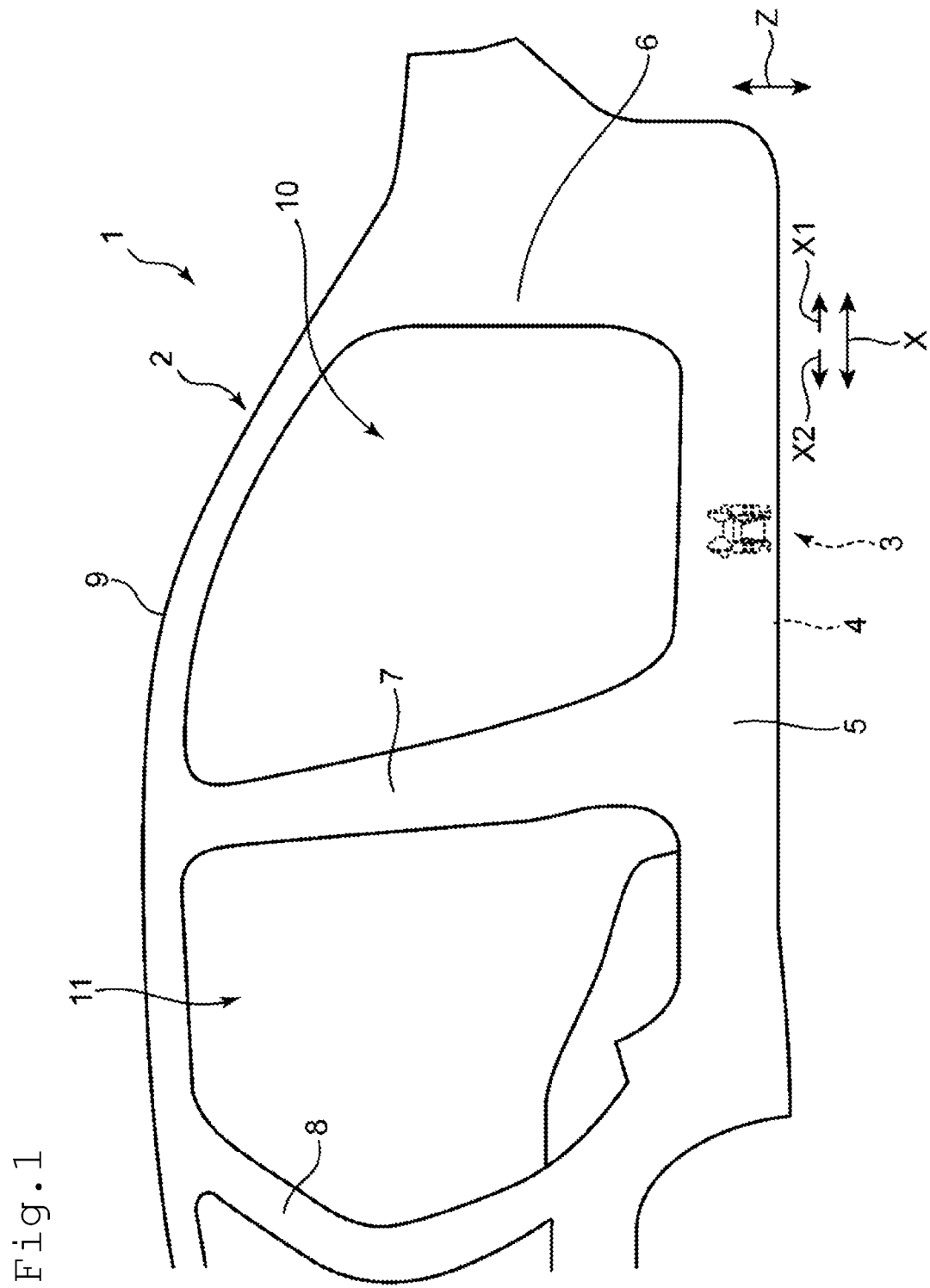
FIG. 1 is a front view showing a vehicle body structure for a vehicle according to an embodiment of the present disclosure.

As shown in FIG. 1, the frame 2 includes: as parts constituting each of both side portions of the vehicle body 1, a side sill 5 extending in a vehicle front-rear direction X along a side portion of a vehicle body floor; three pillars, namely a front pillar 6, a center pillar 7 and a rear pillar 8 disposed spaced apart from each other in the vehicle front-rear direction X and extending in a height direction Z; and a roof rail 9 extending in the vehicle front-rear direction X at an upper position spaced apart from the side sill 5. The lower ends of the front pillar 6, the center pillar 7 and the rear pillar 8 are connected to the side sill 5, and the upper ends thereof are connected to the roof rail 9. Consequently, a front door opening 10 is formed on a vehicle front side X1 in the side portion of the vehicle body 1, and a rear door opening 11 is formed on a vehicle rear side X2.

The side sill 5, the front pillar 6, the center pillar 7, the rear pillar 8 and the roof rail 9 constituting the frame 2 are hollow bodies and have independent closed cross-section portions, respectively.

Figure 2:
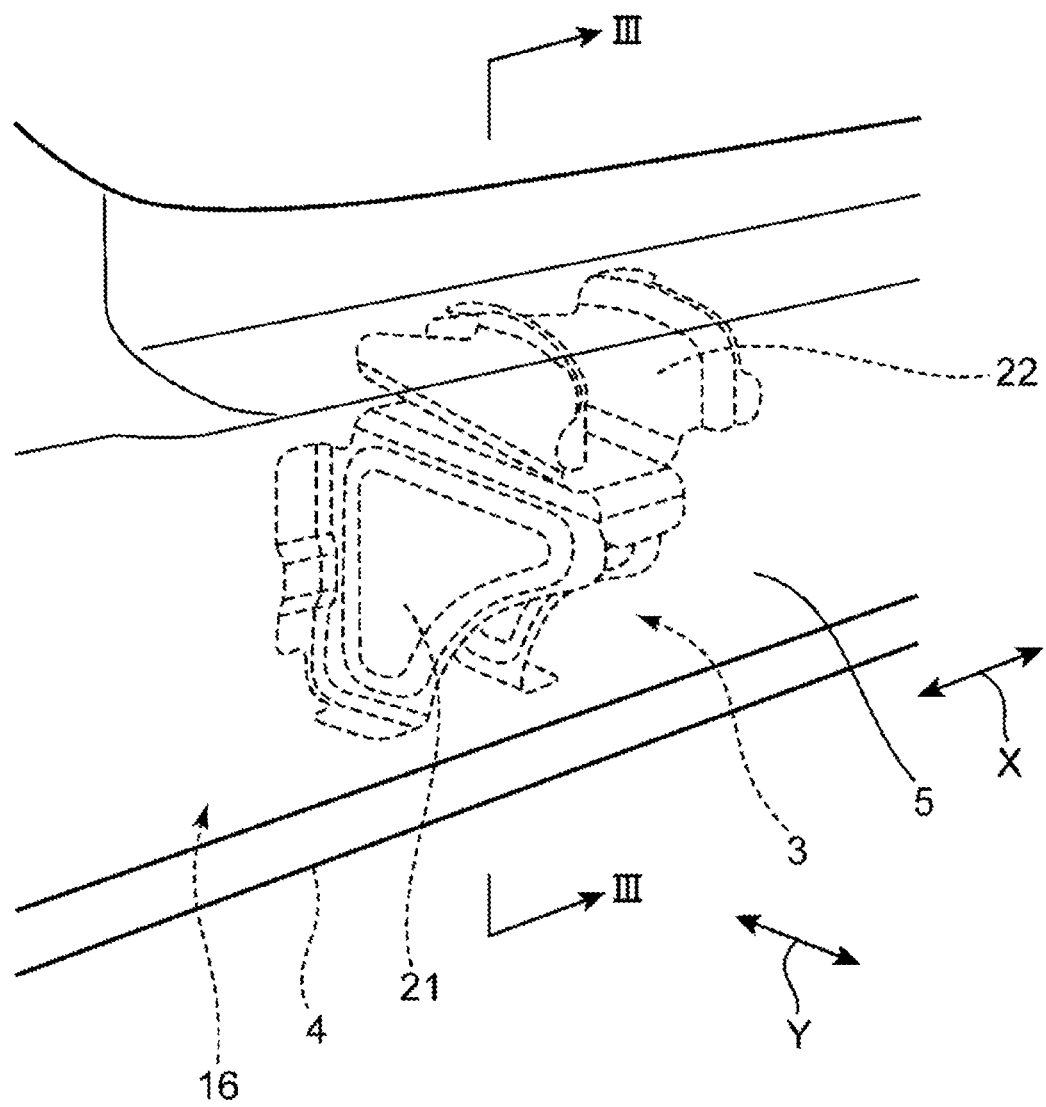
FIG. 2 is an enlarged perspective view of a portion of a side sill of FIG. 1 in which a reinforcement member is mounted.
Figure 3:
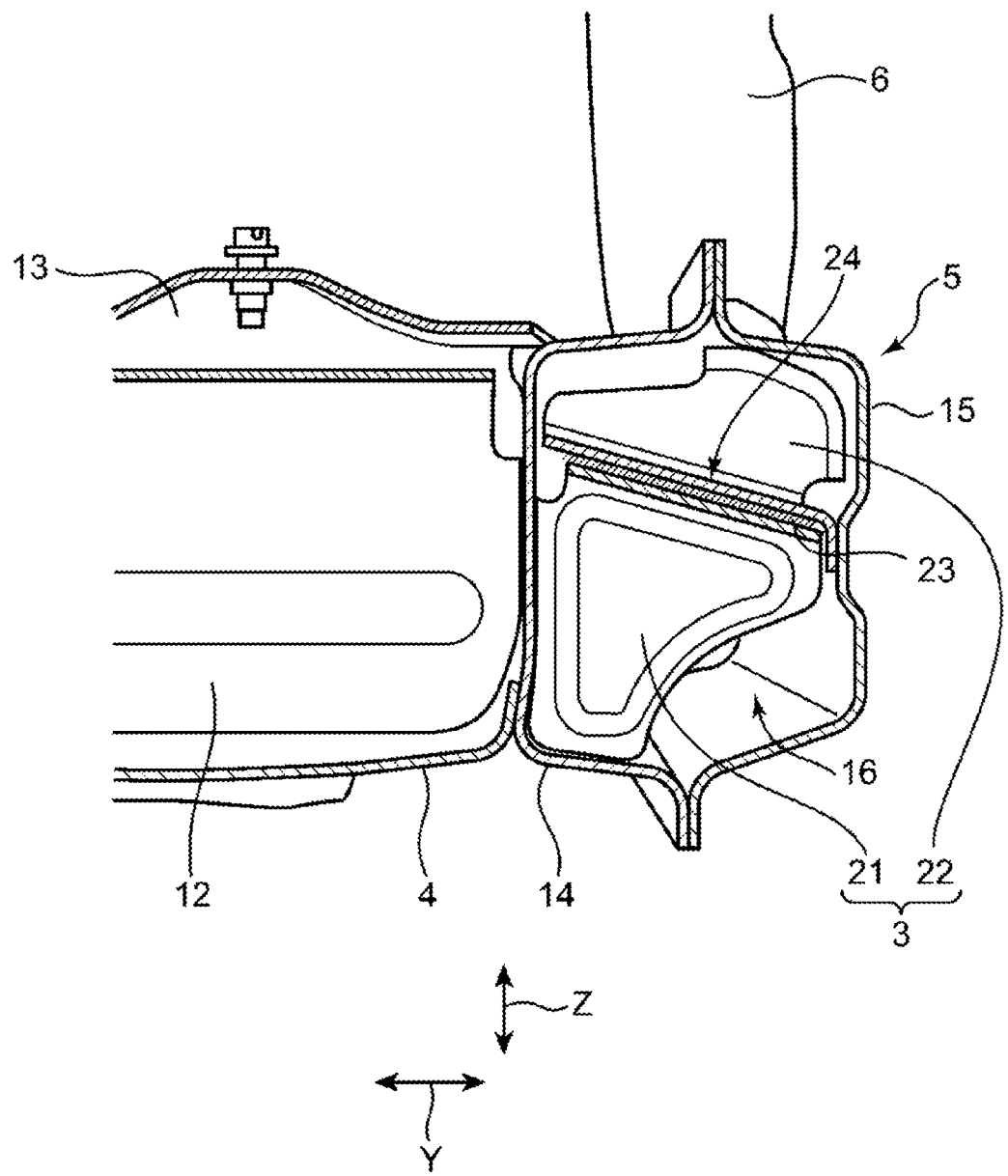
FIG. 3 is a cross sectional view taken along a line of FIG. 2.
Figure 4:
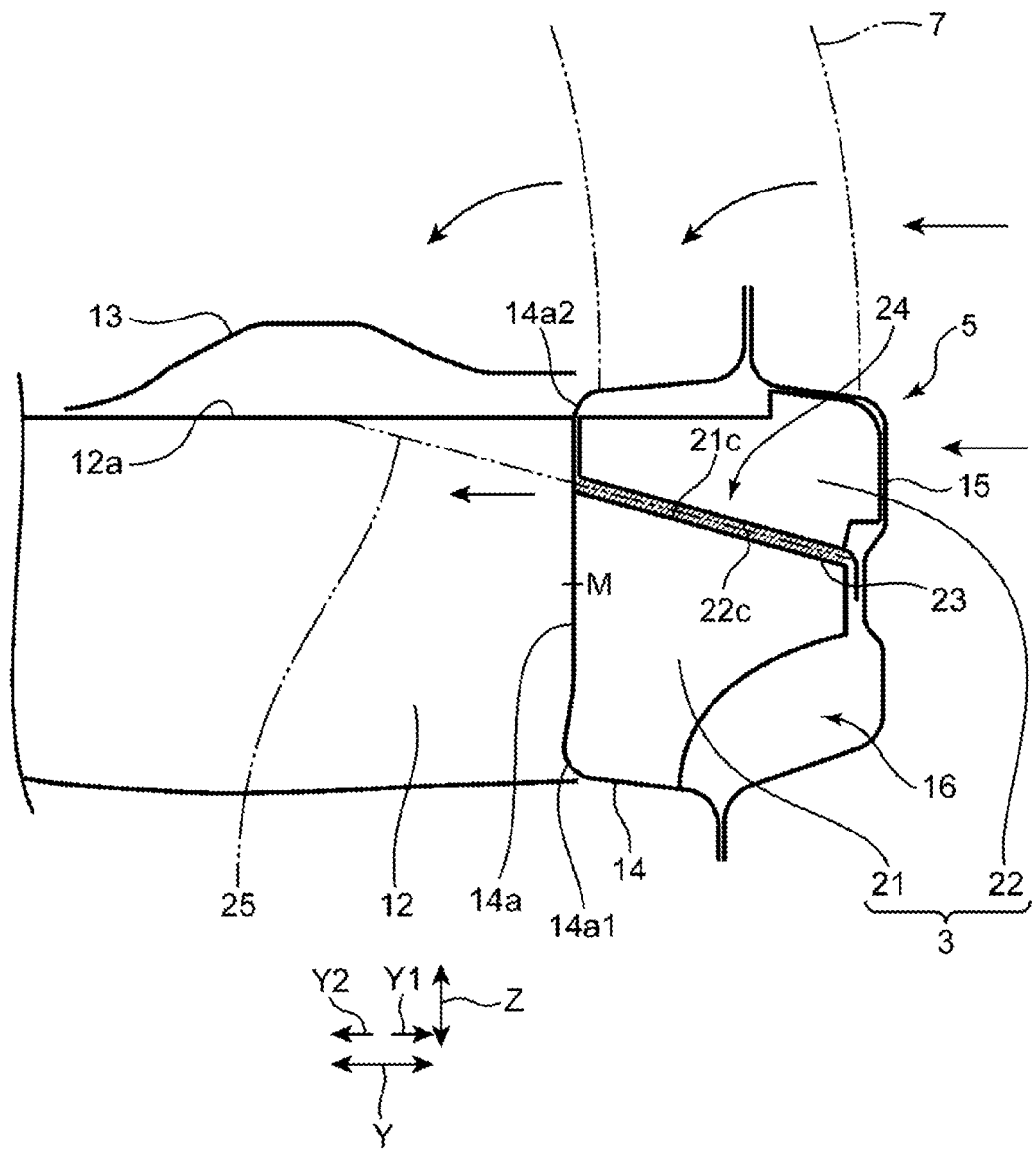
FIG. 4 is a cross section explanatory view schematically showing the reinforcement body of FIG. 3 and the periphery thereof.
Figure 5:
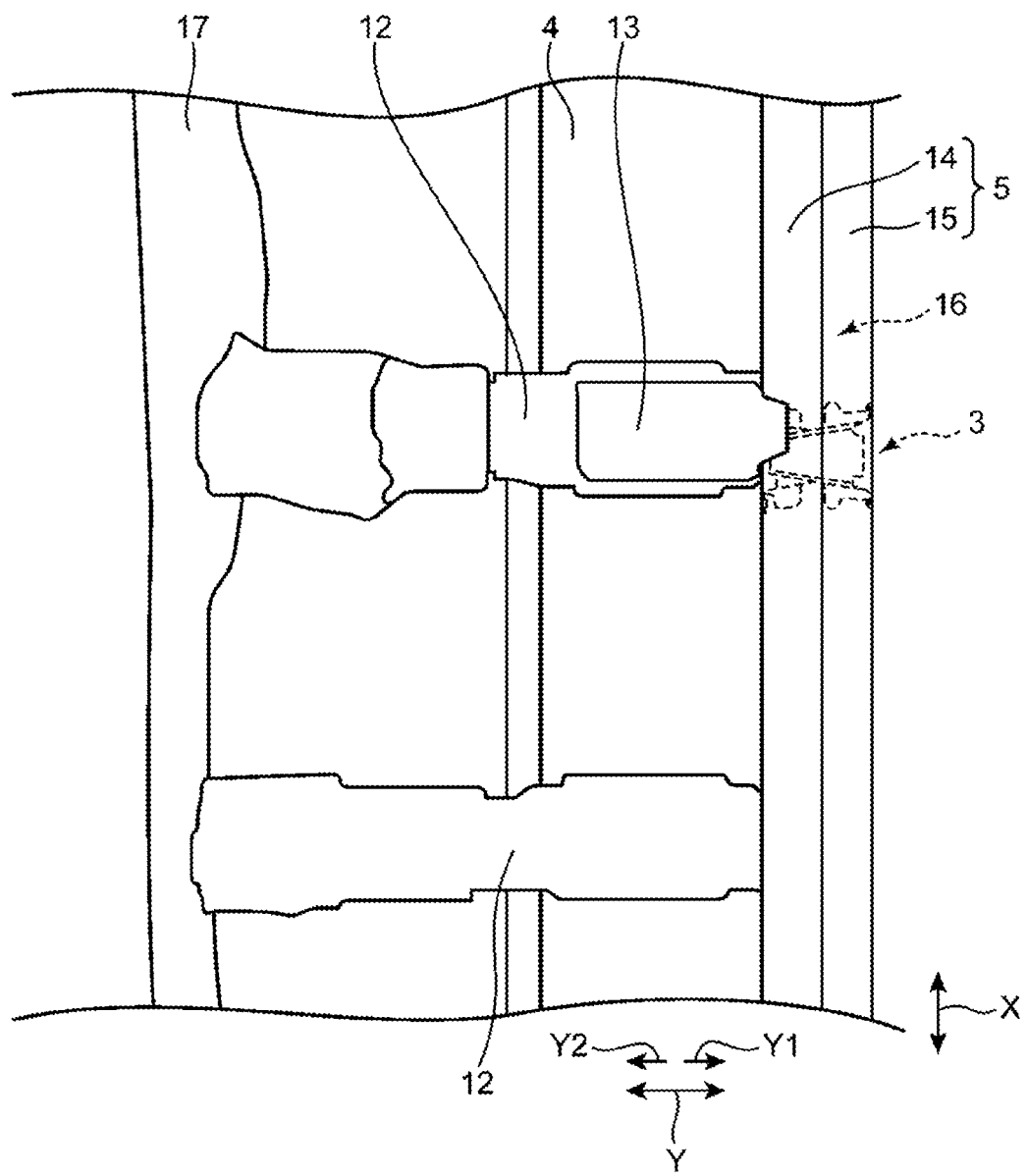
FIG. 5 is a plan view of a portion around a cross member in a floor portion of the vehicle body of FIG. 1.
Figure 6:
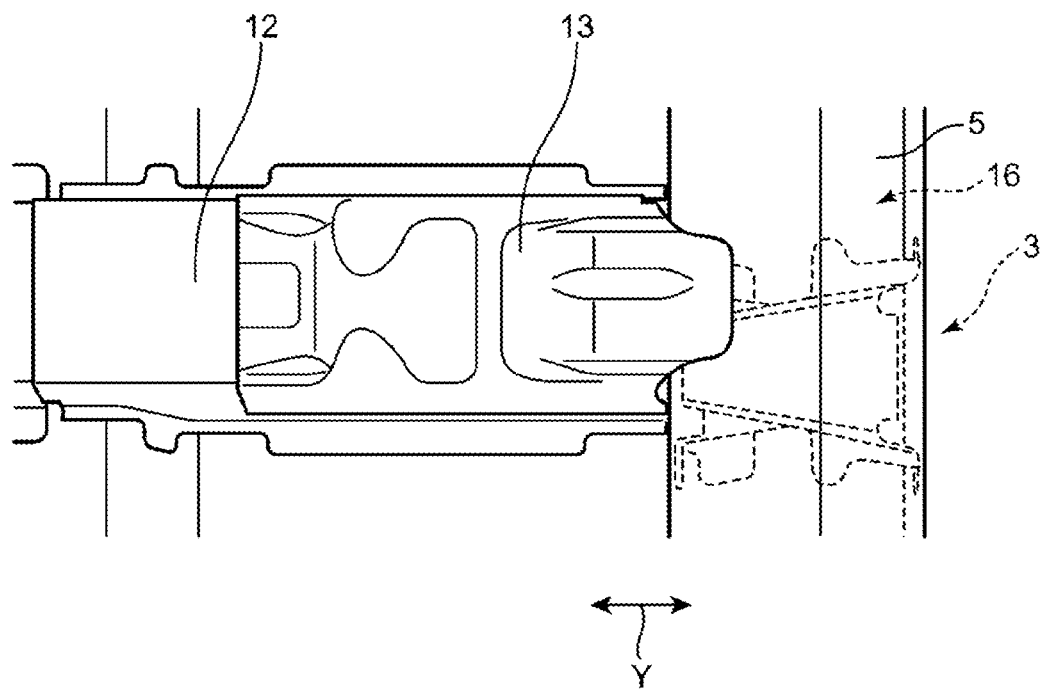
FIG. 6 is a plan view showing a joined portion between the cross member of FIG. 5 and the side sill, the reinforcement body and the periphery thereof.

Specifically, the side sill 5 of the present embodiment has a closed cross-section portion 16 extending in the vehicle front-rear direction X as shown in FIGS. 2 to 4. The closed cross-section portion 16 has a substantially rectangular cross sectional shape.

The side sill 5 is composed of a side sill inner portion 14 (inner portion) disposed on an inner side Y2 in a vehicle width direction Y and a side sill outer portion 15 (outer portion) disposed on an outer side Y1 in the vehicle width direction Y, and has a configuration divided into the side sill inner portion 14 and the side sill outer portion 15. Each of the side sill inner portion 14 and the side sill outer portion 15 has a so-called hat-shaped profile having a U-shaped cross section as a whole with brims protruding upward and downward. Each of the side sill inner portion 14 and the side sill outer portion 15 is formed by press forming a metal plate such as steel, or by other method. The side sill inner portion 14 and the side sill outer portion 15 are joined together by spot welding at the upper and lower brim portions. The side sill 5 having the closed cross-section portion 16 is formed by the side sill inner portion 14 and the side sill outer portion 15 joined together.

In the present embodiment, the reinforcement body 3 is disposed inside the closed cross-section portion 16 of the side sill 5 of the frame 2, and is joined to an inner wall of the side sill 5 by spot welding or the like. The side sill 5 has the closed cross-section portion 16 that is large and long relative to other members, and therefore the side sill 5 is easily deformed and damaged when another vehicle or the like collides with a side surface of the vehicle body 1 (side collision). Hence, by providing the reinforcement body 3 inside the side sill 5, it is possible to reinforce the side sill 5 and prevent deformation and damage during a side collision.

As shown in FIGS. 2 to 15, the reinforcement body 3 is divided into two parts, or is composed of a first reinforcement portion 21 and a second reinforcement portion 22. Each of the first reinforcement portion 21 and the second reinforcement portion 22 is formed by press forming a metal plate such as steel, or by other method.

The first reinforcement portion 21 has a first bonding surface 21c on the upper side, and a configuration capable of being joined to the inner wall of the closed cross-section portion 16 of the side sill 5 at a portion other than the first bonding surface 21c.

Figure 12:
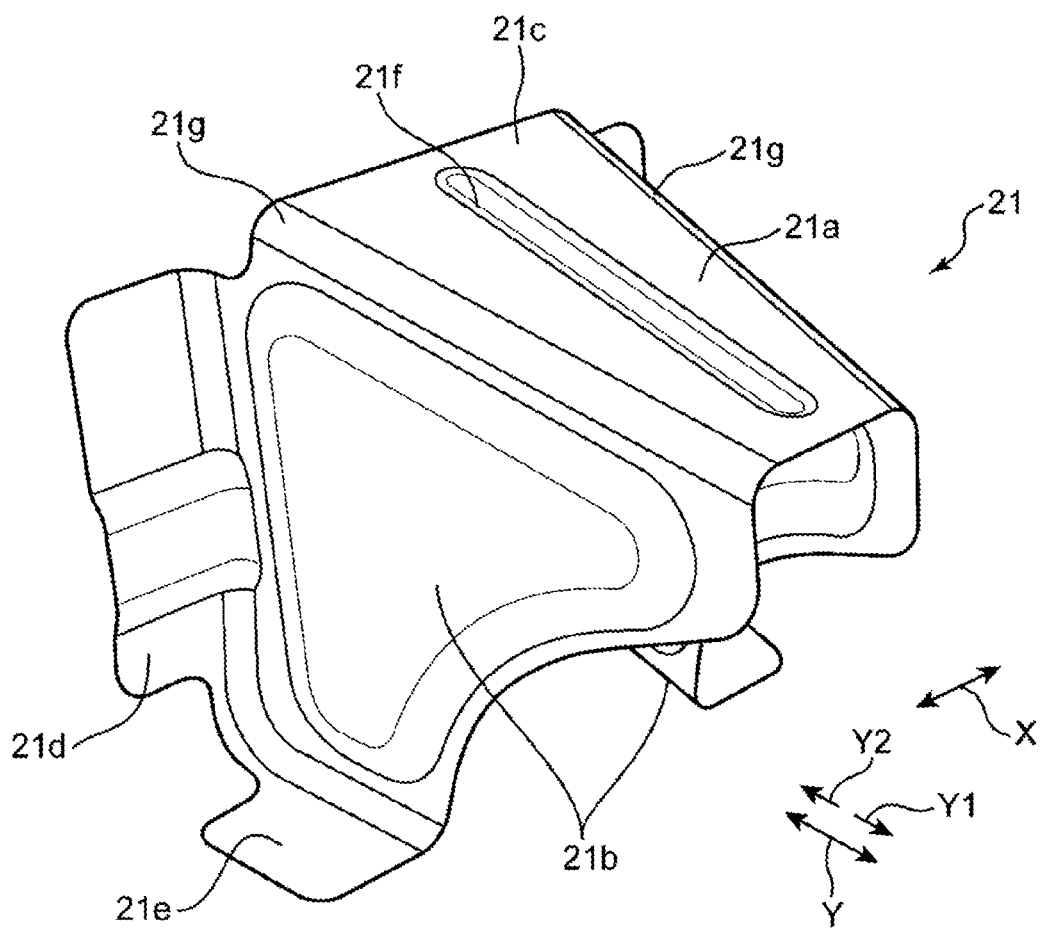
FIG. 12 is a perspective view of the first reinforcement portion of FIG. 8 as seen from the vehicle-width-direction outer side.
Figure 13:
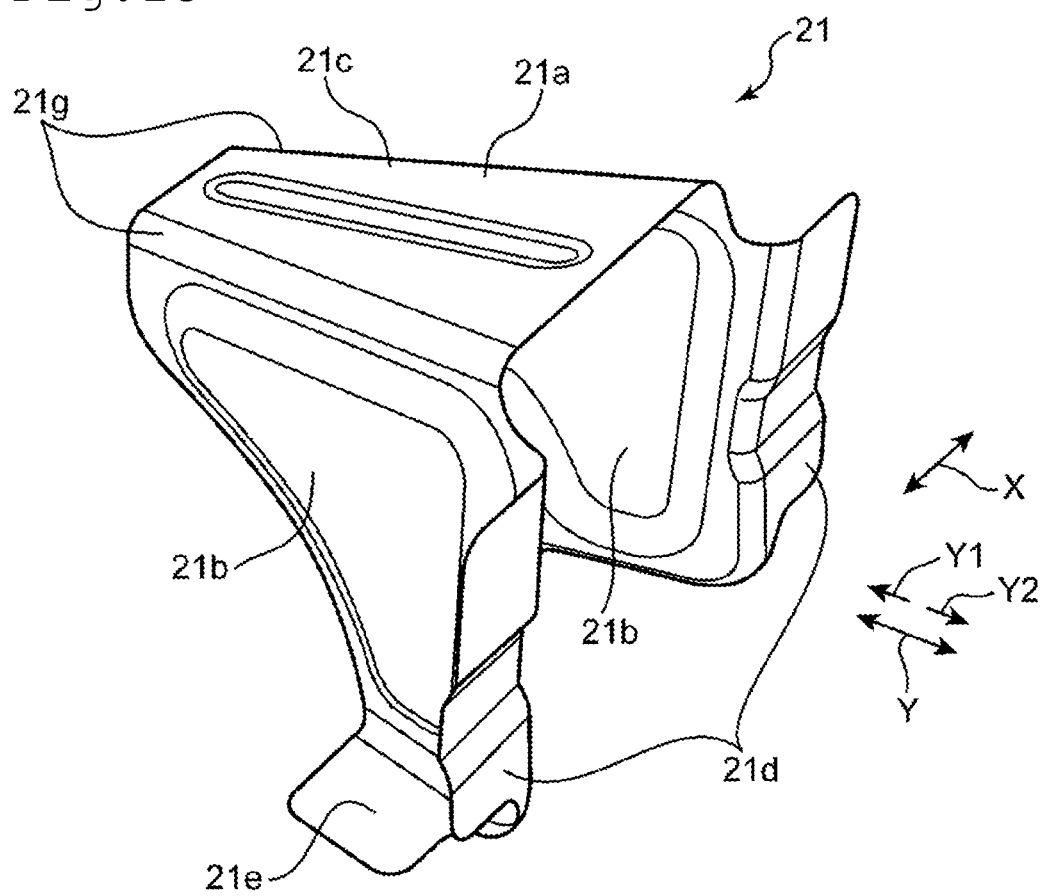
FIG. 13 is a perspective view of the first reinforcement portion of FIG. 8 as seen from the vehicle-width-direction inner side.
Figure 16:
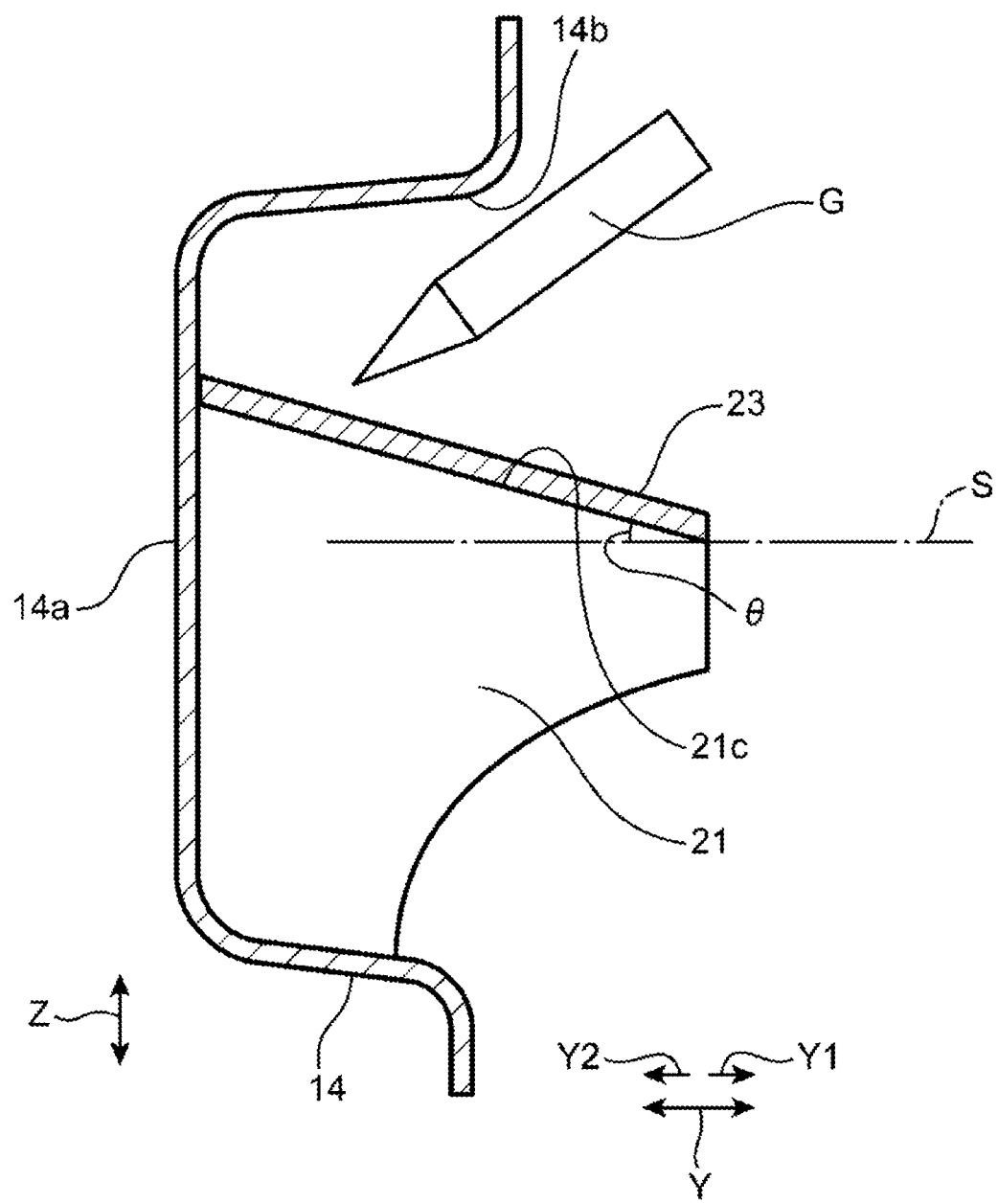
FIG. 16 is an explanatory view of a manufacturing method of a vehicle of the present disclosure and is a cross section explanatory view showing a damping bond application step for applying a damping bond to a first bonding surface of the first reinforcement portion.
Figure 17:
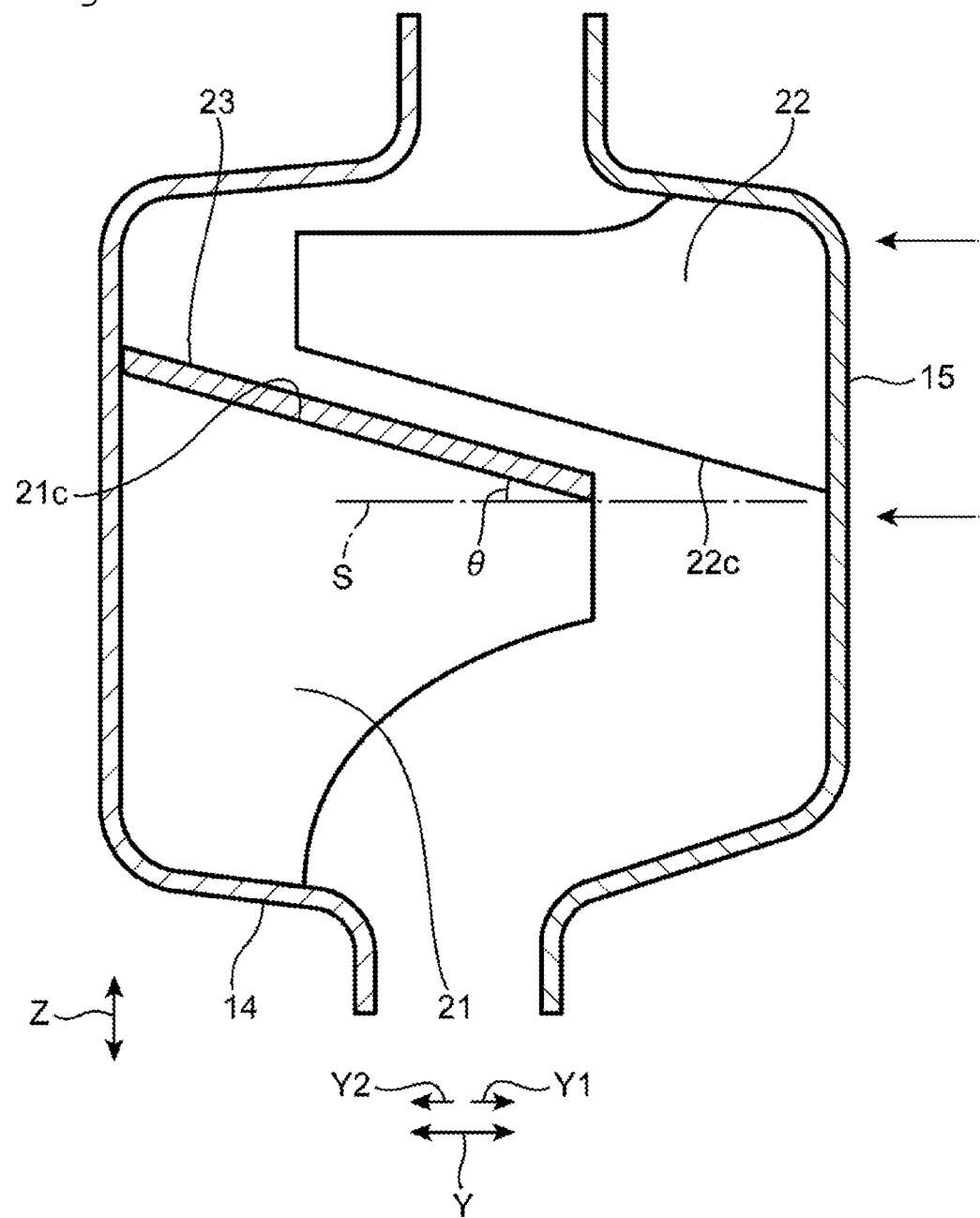
FIG. 17 is an explanatory view of the manufacturing method of a vehicle of the present disclosure and is a cross section explanatory view showing a bonding step for bonding a second bonding surface to the first bonding surface through the damping bond.

Specifically, as shown in FIGS. 12 to 13, the first reinforcement portion 21 includes an upper portion 21a extending in the vehicle width direction Y, and side portions 21b (vertical walls) disposed to extend in an up-down direction on both side edges of the upper portion 21a (both sides in the vehicle front-rear direction X). The upper portion 21a has the first bonding surface 21c on the upper side (the upper surface of the upper portion 21a). Each side portion 21b has a first flange 21d and a second flange 21e that are joined to the side sill inner portion 14 constituting the inner wall of the closed cross-section portion 16. The first flange 21d and the second flange 21e are joined to the side surface and the lower surface, respectively, of the inner wall of the side sill inner portion 14 by spot welding or the like. Consequently, the first reinforcement portion 21 is fixed to the inner side of the side sill inner portion 14 so that the first bonding surface 21c is exposed upward as shown in FIGS. 16 to 17.

As shown in FIGS. 12 to 13 and FIGS. 16 to 17, the first bonding surface 21c is inclined at an angle θ of 30 degrees or less with respect to a horizontal plane S (see FIGS. 16 to 17) so that the first bonding surface 21c slightly rises toward the inner side Y2 in the vehicle width direction Y. A later-described damping bond 23 is entirely applied to the first bonding surface 21c, but, since the inclination angle is 30 degrees or less, dripping of the damping bond 23 is prevented. In the present embodiment, a groove 21f extending in the vehicle width direction Y is formed on the first bonding surface 21c, and therefore dripping of the damping bond 23 is more reliably prevented, but the groove 21f is not essential in the present disclosure.

As shown in FIGS. 12 to 13, the first bonding surface 21c has a tapered shape with a width decreasing toward the outer side Y1 in the vehicle width direction Y. Specifically, two ridge portions 21g, which are formed by providing the side portions 21b (vertical walls) on both the side edges of the first bonding surface 21c, extend in directions getting closer to each other toward the outer side Y1 in the vehicle width direction Y.

The second reinforcement portion 22 has a second bonding surface 22c facing the first bonding surface 21c from above the first bonding surface 21c of the first reinforcement portion 21. The second reinforcement portion 22 has a configuration capable of being joined to the inner wall of the closed cross-section portion 16 of the side sill 5 at a portion other than the second bonding surface 22c.

Figure 14:
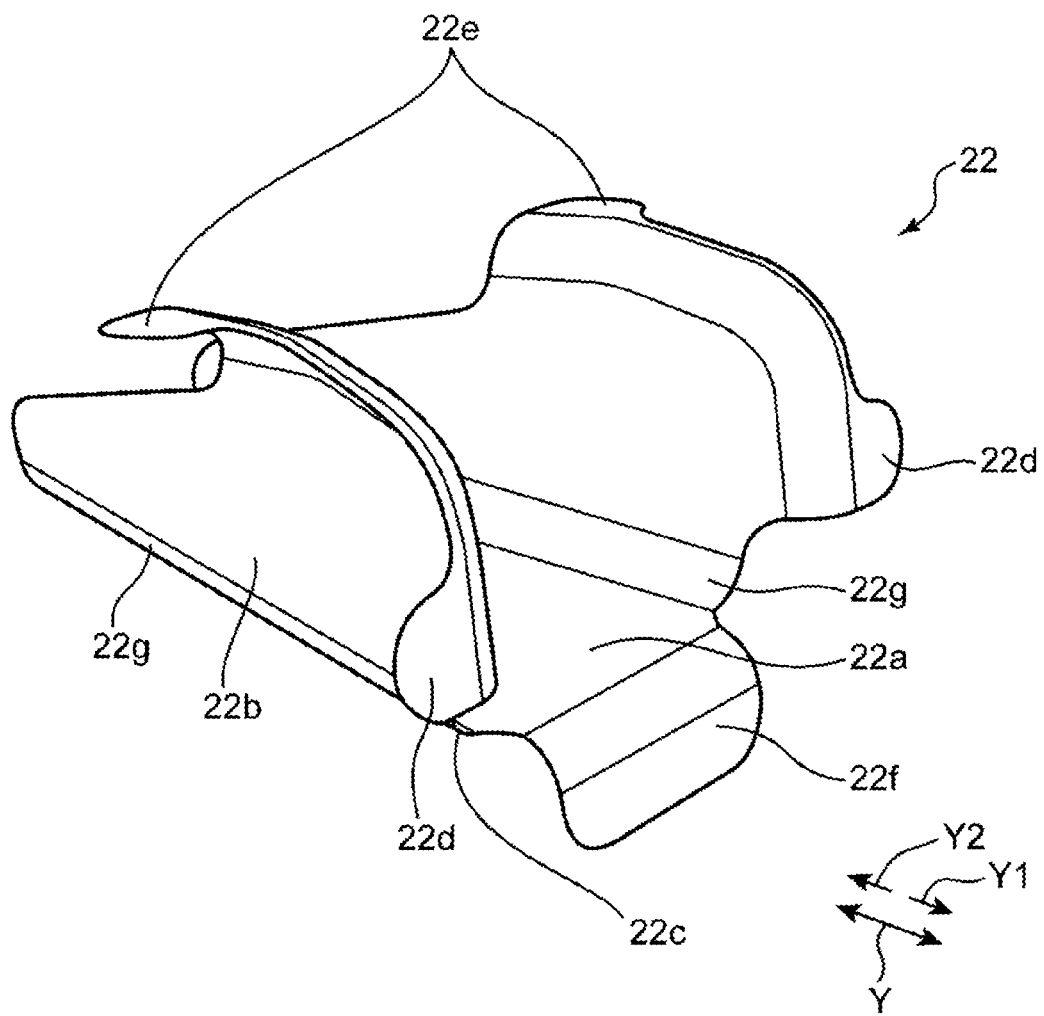
FIG. 14 is a perspective view showing the second reinforcement portion of FIG. 8 as seen from the vehicle-width-direction outer side.
Figure 15:
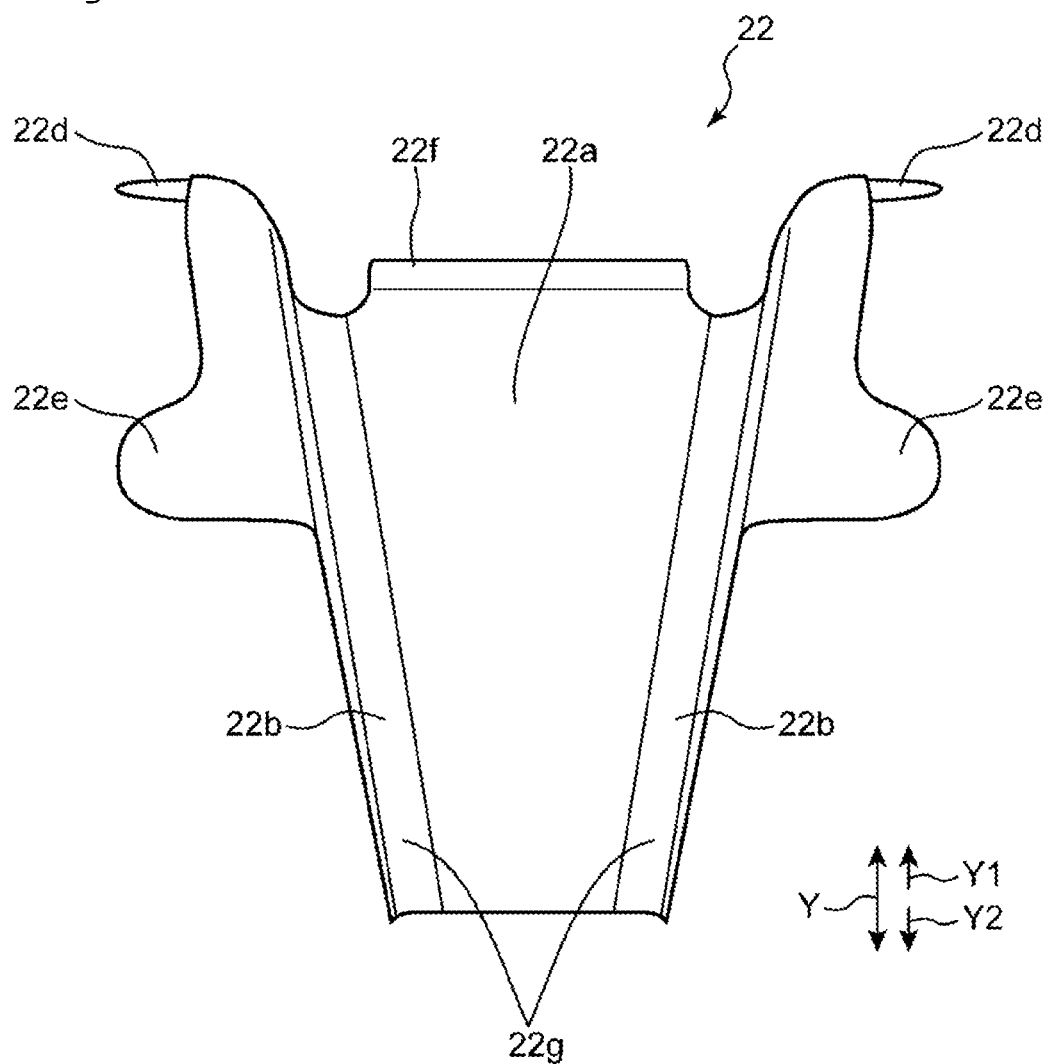
FIG. 15 is a plan view of the second reinforcement portion of FIG. 14 as seen from above.

Specifically, as shown in FIGS. 14 to 15, the second reinforcement portion 22 includes a lower portion 22a extending in the vehicle width direction Y, and side portions 22b (vertical walls) disposed to extend in the up-down direction on side edges of the lower portion 22a (both sides in the vehicle front-rear direction X). The lower portion 22a has the second bonding surface 22c facing downward (the lower surface of the lower portion 22a). Each side portion 22b has a first flange 22d, a second flange 22e and a third flange 22f that are joined to the side sill outer portion 15 constituting the inner wall of the closed cross-section portion 16. Each of the first flanges 22d and the third flange 22f is joined to the side surface of the inner wall of the side sill outer portion 15 by spot welding or the like. Moreover, the second flanges 22e are joined to the upper surface of the inner wall of the side sill outer portion 15 by spot welding or the like. Consequently, the second reinforcement portion 22 is fixed to the inner side of the side sill outer portion 15 so that the second bonding surface 22c faces downward as shown in FIG. 17.

The second bonding surface 22c is inclined at the same angle as the first bonding surface 21c to face the first bonding surface 21c (that is, extends in parallel with the first bonding surface 21c). Specifically, as shown in FIG. 14 and FIG. 17, the second bonding surface 22c is inclined at an angle of 30 degrees or less with respect to the horizontal plane so that the second bonding surface 22c slightly rises toward the inner side Y2 in the vehicle width direction Y.

As shown in FIGS. 14 to 15, the second bonding surface 22c has a tapered shape with a width increasing toward the outer side Y1 in the vehicle width direction Y. Specifically, two ridge portions 22g, which are formed by providing the side portions 22b (vertical walls) on both side edges of the second bonding surface 22c, extend in directions separating from each other toward the outer side Y1 in the vehicle width direction Y.

As shown in FIGS. 3 to 4, the first bonding surface 21c and the second bonding surface 22c are bonded together through the damping bond 23 as a damping member made of an adhesive material.

The damping bond 23 is an adhesive material having slight fluidity before being cured, and is composed, for example, of an epoxy-based, urethane-based or acrylic-based adhesive, and an additive, such as a curing agent, an inorganic or organic filler, or a hygroscopic material, added to the adhesive.

The first bonding surface 21c and the second bonding surface 22c extending parallel to the first bonding surface 21c are disposed so that the inclination angle θ with respect to the horizontal plane S (see FIGS. 16 to 17) is 30 degrees or less, and, if the inclination angle is 30 degrees or less, the damping bond 23 adheres to the first bonding surface 21c and can stay on the surface of the first bonding surface 21 without flowing even before being cured.

As shown in FIG. 17, the first bonding surface 21c and the second bonding surface 22c are inclined upward toward the inner side Y2 in the vehicle width direction Y of the side sill 5 of the frame 2.

Further, in the present embodiment, as shown in FIGS. 4 to 7, the reinforcement body 3 is disposed at a position aligned with a cross member 12 in the vehicle width direction Y inside the closed cross-section portion 16 of the side sill 5.

The cross member 12 is a member extending in the vehicle width direction Y at a lower portion of the vehicle body 1 (a position slightly above the floor panel 4). An end of the cross member 12 on the outer side Y1 in the vehicle width direction Y is joined to the side sill 5, and an end on the inner side Y2 in the vehicle width direction Y is joined to a floor tunnel portion 17. The floor tunnel portion 17 extends in the vehicle front-rear direction X in the vicinity of the center of the vehicle body 1 in the vehicle width direction Y. As shown in FIGS. 3 to 6, a seat mounting bracket 13 is attached to an upper surface of the end of the cross member 12 on the outer side Y1 in the vehicle width direction Y.

Figure 7:
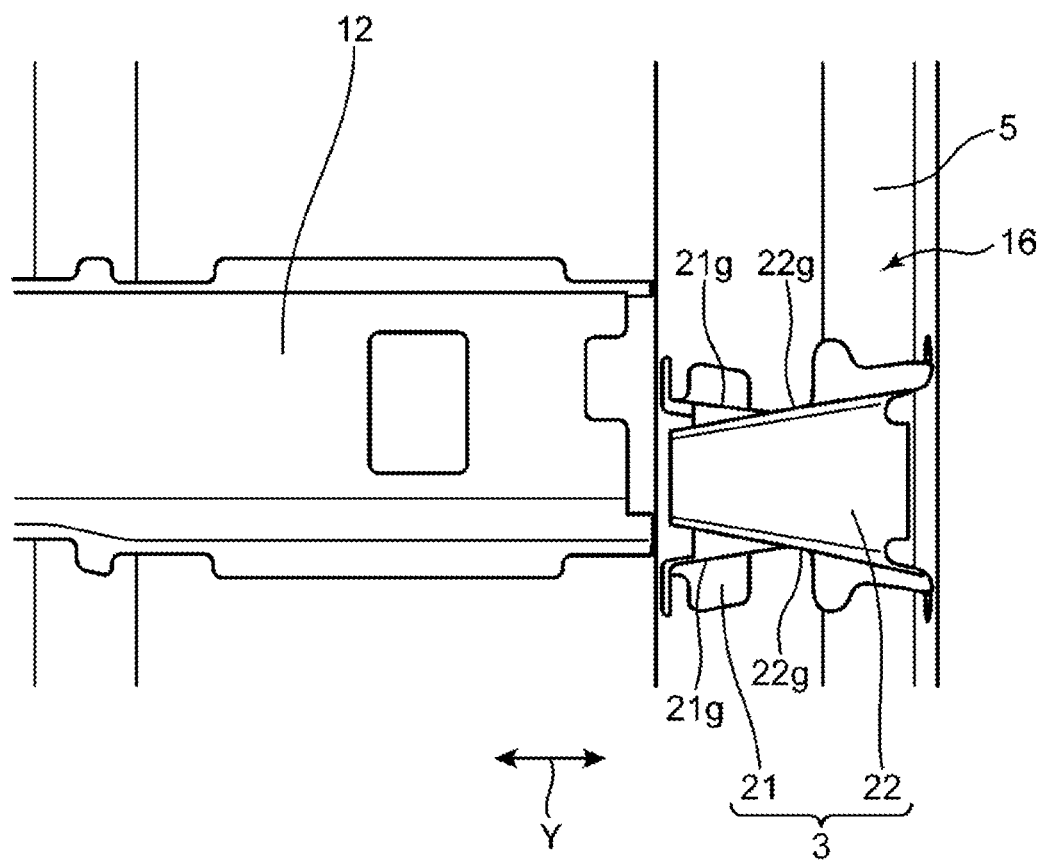
FIG. 7 is a plan view showing a state in which the reinforcement body inside a closed cross-section portion of the side sill is exposed to the outside by omitting a seat mounting bracket and an upper side of the side sill of FIG. 6.
Figure 8:
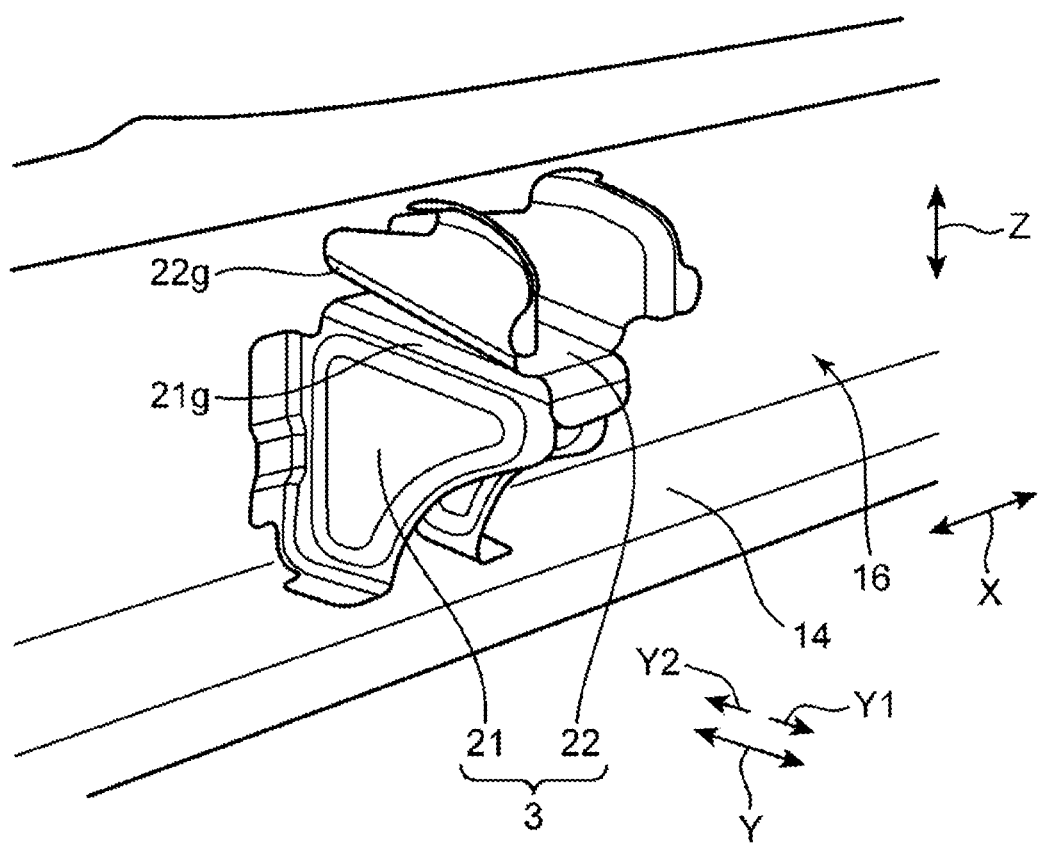
FIG. 8 is a perspective explanatory view showing a state in which the reinforcement body is exposed to the outside by removing a side sill outer portion of FIG. 2.

By providing the side portions 21b, 22b (vertical walls) on at least one of joining surfaces 21c, 22c of the mutually facing first bonding surface 21c and second bonding surface 22c, in the present embodiment, on the side edges of both the first bonding surface 21c and the second bonding surface 22c, ridge portions 21g, 22g extending in the vehicle width direction Y are formed as shown in FIGS. 12 to 15. Consequently, the load received from the outside of the vehicle body 1 during a side collision or the like can be smoothly transmitted to the cross member 12 via the four ridge portions 21g, 22g of the reinforcement body 3 as shown in FIG. 7.

In the present embodiment, as shown in FIG. 4, in a front view of the vehicle, the first bonding surface 21c and the second bonding surface 22c are disposed so that an extension line 25 extending between the first bonding surface 21c and the second bonding surface 22c to the inner side Y2 in the vehicle width direction Y intersects the side sill 5 at an intermediate position M or a higher position in a height direction Z of the side surface on the inner side Y2 (namely, the side sill inner portion 14) in the vehicle width direction Y of the side sill 5.

Here, the "intermediate position M" of the side sill 5 is, for example, an intermediate position between a lower ridge 14a1 and an upper ridge 14a2 of a side surface 14a of the side sill inner portion 14.

The extension line 25 extends upward toward the inner side Y2 in the vehicle width direction Y, intersects the side sill inner portion 14, and extends toward an upper surface 12a of the cross member 12.

A vehicle having the vehicle body structure configured as described above is manufactured as follows.

First, the frame 2 including the side sill 5, which is composed of the side sill inner portion 14 disposed on the inner side Y2 in the vehicle width direction Y and the side sill outer portion 15 disposed on the outer side Y1 in the vehicle width direction Y and divided into the side sill inner portion 14 and the side sill outer portion 15, is prepared (frame preparation step).

Figure 9:
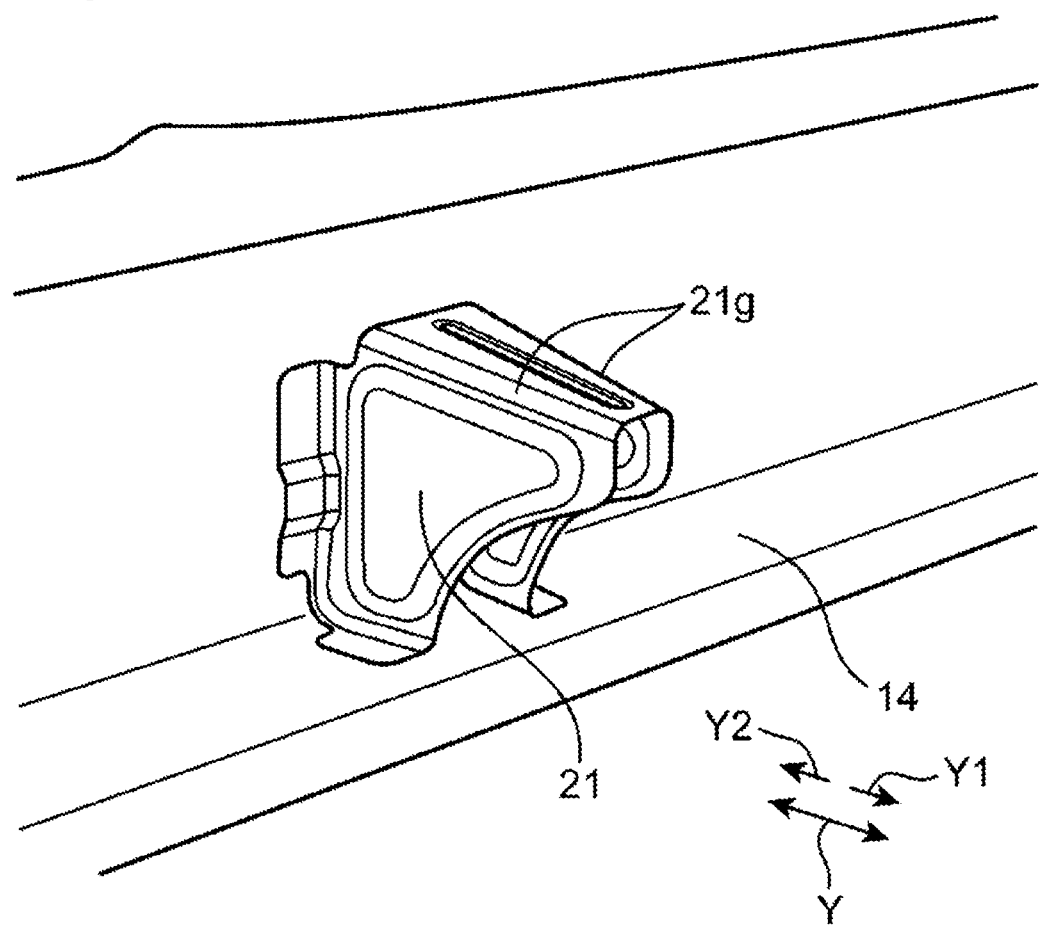
FIG. 9 is a perspective explanatory view showing a first reinforcement portion on the lower side by removing a second reinforcement portion on the upper side of the reinforcement body of FIG. 8.
Figure 10:
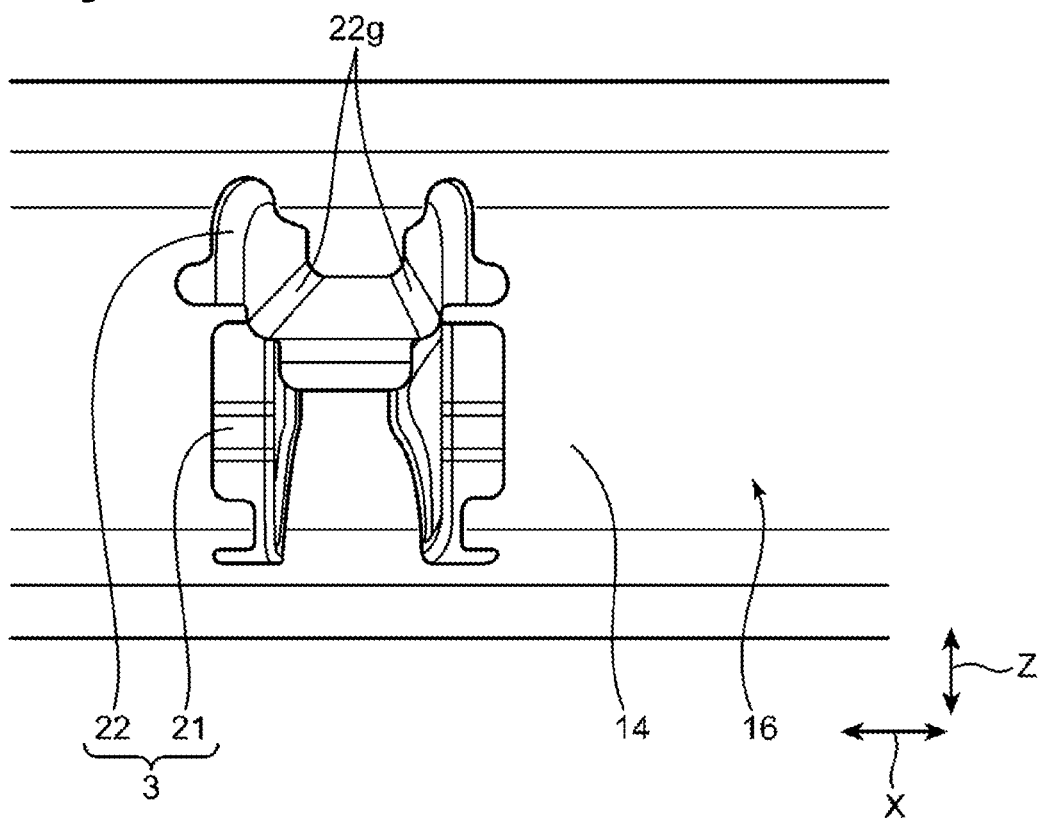
FIG. 10 is a view showing a state of the reinforcement body of FIG. 8 as seen from the vehicle-width-direction outer side.
Figure 11:
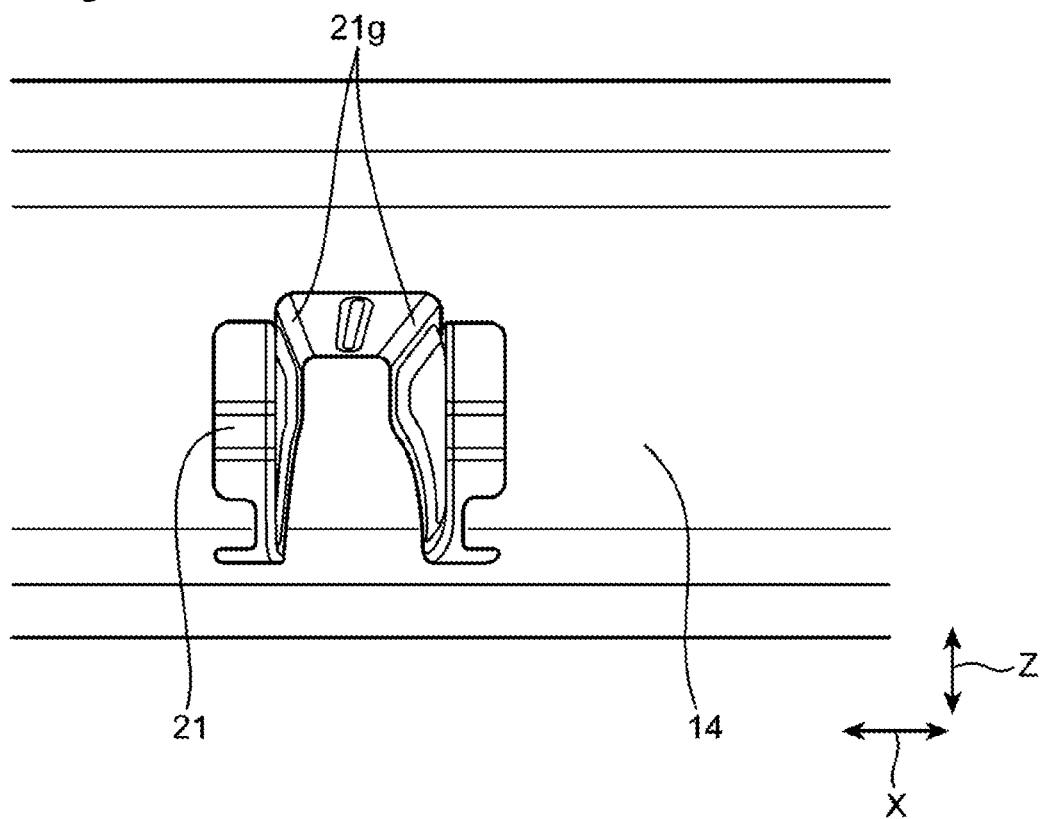
FIG. 11 is a view showing the first reinforcement portion on the lower side by removing the second reinforcement portion on the upper side of the reinforcement body of FIG. 10.

Next, as shown in FIGS. 9 and 16, in a state in which the first reinforcement portion 21 is joined to the inner wall of the side sill inner portion 14 of the side sill 5 by spot welding or the like, the damping bond 23 is applied to the first bonding surface 21c (damping bond application step).

When applying the damping bond 23, the tip of a device such as an applicator gun G is inserted into the inside of the side sill inner portion 14, and the damping bond 23 is applied to the first bonding surface 21c through the tip of the applicator gun G. Since the first bonding surface 21c is inclined upward toward the inner side Y2 in the vehicle width direction Y, the applicator gun G does not interfere with a corner portion 14b of the side sill 5 on the inner side Y2 in the vehicle width direction Y.

Next, as shown in FIG. 17, in a state in which the second reinforcement portion 22 is joined to the inner wall of the side sill outer portion 15 of the side sill 5, the second bonding surface 22c is bonded to the first bonding surface 21c through the dumping bond 23 by bringing the second bonding surface 22c closer to the first bonding surface 21c while placing the second bonding surface 22c to face the first bonding surface 21c (bonding step). Consequently, the divided first reinforcement portion 21 and second reinforcement portion 22 are joined together to form one reinforcement body 3.

Finally, by joining the side sill inner portion 14 and the side sill outer portion 15 together, the side sill 5 having the closed cross-section portion 16 is formed as shown in FIGS. 3 to 4 and the frame 2 is formed (frame formation step). In the side sill 5 after being formed, the reinforcement body 3 is accommodated inside the closed cross-section portion 16, and the reinforcement body 3 can function as a joint member that reinforces the hollow side sill 5.

Characteristics of the Present Embodiment (1)

As described above, the vehicle body structure for a vehicle of the present embodiment has the frame 2 including the side sill 5 having the closed cross-section portion 16, and the reinforcement body 3 disposed inside the closed cross-section portion 16 and joined to the side sill 5. The reinforcement body 3 is composed of the first reinforcement portion 21 and the second reinforcement portion 22. The first reinforcement portion 21 has the first bonding surface 21c on the upper side and is joined to the inner wall of the closed cross-section portion 16 at a portion other than the first bonding surface 21c. The second reinforcement portion 22 has the second bonding surface 22c facing the first bonding surface 21c from above the first bonding surface 21c, and is joined to the inner wall of the closed cross-section portion 16 at a portion other than the second bonding surface 22c. The first bonding surface 21c and the second bonding surface 22c are bonded together through the damping bond 23 as a damping member made of an adhesive material having slight fluidity before being cured. The first bonding surface 21c and the second bonding surface 22c are disposed so that the inclination angle with respect to the horizontal plane S (see FIGS. 16 to 17) is 30 degrees or less.

In the above-described configuration, as shown in FIGS. 3 to 4, the reinforcement body 3 reinforces the frame 2 by being disposed in the closed cross-section portion 16 of the side sill 5. The reinforcement body 3 has a divided configuration composed of the first reinforcement portion 21 and the second reinforcement portion 22, and the mutually facing first bonding surface 21c and second bonding surface 22c of the first reinforcement portion 21 and the second reinforcement portion 22 are bonded together through the damping bond 23 made of an adhesive material, and therefore vibration transmitted to the reinforcement body 3 can be damped by the damping bond 23. In such a structure, since the first bonding surface 21c and the second bonding surface 22c are disposed at an inclination angle of 30 degrees or less with respect to the horizontal plane S (see FIGS. 16 to 17) (in short, substantially horizontally), even if the damping bond 23 has slight fluidity before being cured, it is possible to prevent the damping bond 23 from dripping from the first bonding surface 21c. As a result, it is possible to prevent dripping of the damping bond 23 at opposing surfaces 24 of the reinforcement body 3 having the divided structure (the opposing surfaces formed by the first bonding surface 21c and the second bonding surface 22c), and the damping bond 23 can exhibit a predetermined damping performance.

(2)

In the vehicle body structure for a vehicle of the present embodiment, as shown in FIGS. 3 to 4, the first bonding surface 21c and the second bonding surface 22c of the reinforcement body 3 are inclined surfaces rising toward the inner side Y2 in the vehicle width direction Y of the side sill 5.

According to this configuration, when applying the damping bond 23 to the first bonding surface 21c as shown in FIG. 16 before joining the first bonding surface 21c and the second bonding surface 22c together, it is possible to insert the tip of a device, such as the applicator gun G for applying the damping bond 23, into a portion of the side sill 5 on the inner side Y2 in the vehicle width direction Y without interference. Moreover, it is possible to place the second bonding surface 22c to face the first bonding surface 21c and join the second bonding surface 22c to the first bonding surface 21c without dropping the damping bond 23 applied to the first bonding surface 21c when joining the second bonding surface 22c to the first bonding surface 21c.

(3)

Furthermore, in the vehicle body structure for a vehicle of the present embodiment, as described above, since the first bonding surface 21c and the second bonding surface 22c of the reinforcement body 3 are inclined upward toward the inner side Y2 in the vehicle width direction Y of the side sill 5, when a side collision of the vehicle occurs, as shown in FIG. 4, it is possible to reduce so-called inward falling of the side sill 5 in which the edges of the first bonding surface 21c and the second bonding surface 22c abut on the vicinity of the upper surface 12a of the cross member 12 via the side sill inner portion 14, and consequently the side sill 5 falls inward of the vehicle and deforms together with the center pillar 7.

(4)

The vehicle body structure for a vehicle of the present embodiment has the closed cross-section portion 16, the side sill 5 extending in the vehicle front-rear direction X, and the cross member 12 extending in the vehicle width direction Y and joined to the side sill 5 at an end in the vehicle width direction Y. The reinforcement body 3 is disposed at a position aligned with the cross member 12 in the vehicle width direction Y inside the closed cross-section portion 16 of the side sill 5. By providing the side portions 21b, 22b (vertical walls) on the side edges of the mutually facing first bonding surface 21c and second bonding surface 22c (in the present embodiment, the side edges on both sides of the first bonding surface 21c and second bonding surface 22c), the ridge portions 21g, 22g extending in the vehicle width direction Y are formed.

In this configuration, a collision load input to the side sill 5 during a side collision of the vehicle can be transmitted to the cross member 12 via the ridge portions 21g, 22g extending in the vehicle width direction Y, which are formed by providing the side portions 21b, 22b (vertical walls) on the side edges of the mutually facing first bonding surface 21c and second bonding surface 22c of the reinforcement body 3. As a result, deformation and damage of the side sill 5 can be reduced.

If the ridge portions 21g, 22g are formed on one of the side edges on both sides of the mutually facing first bonding surface 21c and second bonding surface 22c, the ridge portions 21g, 22g can perform the function of transmitting the load to the cross member 12 as described above. However, it is preferable to form the ridge portions 21g, 22g on the side edges on both sides of the first bonding surface 21c and the second bonding surface 22c as in the above-described embodiment, because the rigidity of the entire reinforcement body 3 is improved, and the function of transmitting the load to the cross member 12 can be reliably implemented.

(5)

In the vehicle body structure for a vehicle of the present embodiment, in a front view of the vehicle, the first bonding surface 21c and the second bonding surface 22c are disposed so that the extension line 25 extending between the first bonding surface 21c and the second bonding surface 22c to the inner side Y2 in the vehicle width direction Y intersects the side sill 5 at the intermediate position M or a higher position in the height direction Z of the side surface on the inner side Y2 in the vehicle width direction Y of the side sill 5. In this configuration, during a side collision of the vehicle, the edges of the first bonding surface 21c and the second bonding surface 22c on the inner side Y2 in the vehicle width direction Y abut on the cross member 12 via the side sill 5 at the intermediate position M or a higher position in the height direction Z of the side surface on the inner side Y2 in the vehicle width direction Y of the side sill 5. Consequently, since the ridge portions 21g, 22g formed on the side edges on both sides of the first bonding surface 21c and the second bonding surface 22c function as a support, it is possible to reduce the inward falling deformation of the side sill 5.

As shown in FIG. 4, the extension line 25 extends upward toward the inner side Y2 in the vehicle width direction Y from the intermediate position M or a higher position in the side sill 5, and extends toward the upper surface 12*a* of the cross member 12. Consequently, the load is transmitted to the upper half of the cross member 12 via the ridge portions 21*g*, 22*g*, and the inward falling deformation of the side sill 5 can be reliably reduced.

(6)

A manufacturing method of a vehicle having the vehicle body structure of the present embodiment includes the frame preparation step for preparing the frame 2 including the side sill 5 composed of the side sill inner portion 14 disposed on the inner side Y2 in the vehicle width direction Y and the side sill outer portion 15 disposed on the outer side Y1 in the vehicle width direction Y, and divided into the side sill inner portion 14 and the side sill outer portion 15; the damping bond application step for applying the damping bond 23 to the first bonding surface 21*c* in a state in which the first reinforcement portion 21 is joined to the inner wall of the side sill inner portion 14 of the side sill 5: the bonding step for bonding the second bonding surface 22*c* to the first bonding surface 21*c* through the damping bond 23 by bringing the second bonding surface 22*c* closer to the first bonding surface 21*c* while placing the second bonding surface 22*c* to face the first bonding surface 21*c* in a state in which the second reinforcement portion 22 is joined to the inner wall of the side sill outer portion 15 of the frame 2; and the frame formation step for forming the frame 2 including the side sill 5 by joining the side sill inner portion 14 and the side sill outer portion 15 together.

In this manufacturing method, in the bonding step shown in FIG. 17, the second bonding surface 22*c* is bonded to the first bonding surface 21*c* through the dumping bond 23 by bringing the second bonding surface 22*c* closer to the first bonding surface 21*c* while placing the second bonding surface 22*c* to face the first bonding surface 21*c*. Consequently, since the second bonding surface 22*c* does not push the damping bond 23 along the first bonding surface 21*c*, it is possible to manufacture the vehicle without dropping the damping bond 23 from the first bonding surface 21*c*, and it is possible to ensure the predetermined damping performance of the damping bond 23.

Modification

In the above-described embodiment, the structure of the frame 2 in which the reinforcement body 3 having a divided structure is accommodated inside the closed cross-section portion 16 of the side sill 5 is shown, but the present disclosure is not limited to this. As a modification of the present disclosure, the reinforcement body 3 may be accommodated in other portions constituting the frame 2 (such as, for example, the front pillar 6, the center pillar 7, the rear pillar 8, and the roof rail 9). In this case, it is also possible to exhibit the same function as that of the above-described embodiment.

What is claimed is:

1. A vehicle body structure for a vehicle, the vehicle body structure comprising:
   a frame that constitutes a vehicle body and has a closed cross-section portion; and
   a reinforcement body disposed inside the closed cross-section portion and joined to the frame, wherein
   the reinforcement body comprises a first reinforcement portion and a second reinforcement portion,
   the first reinforcement portion has a first bonding surface on an upper side and is joined to an inner wall of the closed cross-section portion at a portion other than the first bonding surface,
   the second reinforcement portion has a second bonding surface facing the first bonding surface from above the first bonding surface and is joined to the inner wall of the closed cross-section portion at a portion other than the second bonding surface,
   the first bonding surface and the second bonding surface are bonded together through a damping member made of an adhesive material, and
   the first bonding surface and the second bonding surface are disposed at an inclination angle of 30 degrees or less with respect to a horizontal plane extending in a vehicle width direction of the frame.

2. The vehicle body structure for a vehicle according to claim 1, wherein the first bonding surface and the second bonding surface are inclined surfaces rising toward an inner side in a vehicle-width-direction of the frame.

3. The vehicle body structure for a vehicle according to claim 2, wherein the frame has:
   a side sill having the closed cross-section portion and extending in a vehicle front-rear direction along a side portion of a vehicle body floor; and
   a cross member extending in a vehicle width direction and joined to the side sill at an end in the vehicle width direction,
   the reinforcement body is disposed at a position aligned with the cross member in the vehicle width direction inside the closed cross-section portion of the side sill, and
   ridge portions extending in the vehicle width direction are configured by vertical walls on side edges of the mutually facing first bonding surface and second bonding surface.

4. The vehicle body structure for a vehicle according to claim 3, wherein
   in a front view of the vehicle, the first bonding surface and the second bonding surface are disposed so that an extension line extending between the first bonding surface and the second bonding surface to a vehicle-width-direction inner side intersects the side sill at an intermediate position or a higher position in a height direction of a side surface of the side sill on the vehicle-width-direction inner side.

5. A manufacturing method of a vehicle having the vehicle body structure according to claim 1, the method comprising:
   preparing the frame composed of an inner portion disposed on an inner side in the vehicle width direction and an outer portion disposed on an outer side in the vehicle width direction, and divided into the inner portion and the outer portion;
   applying the damping member to the first bonding surface in a state in which the first reinforcement portion is joined to the inner wall of the inner portion of the frame;
   bonding the second bonding surface to the first bonding surface through the damping member by bringing the second bonding surface closer to the first bonding surface while placing the second bonding surface to face the first bonding surface in a state in which the second reinforcement portion is joined to the inner wall of the outer portion of the frame; and
   forming the frame by joining the inner portion and the outer portion together.

6. The vehicle body structure for a vehicle according to claim 1, wherein the frame has:
   a side sill having the closed cross-section portion and extending in a vehicle front-rear direction along a side portion of a vehicle body floor; and a cross member extending in a vehicle width direction and joined to the side sill at an end in the vehicle width direction, the reinforcement body is disposed at a position aligned with the cross member in the vehicle width direction inside the closed cross-section portion of the side sill, and ridge portions extending in the vehicle width direction are configured by vertical walls on side edges of the mutually facing first bonding surface and second bonding surface.

7. The vehicle body structure for a vehicle according to claim 6, wherein in a front view of the vehicle, the first bonding surface and the second bonding surface are disposed so that an extension line extending between the first bonding surface and the second bonding surface to a vehicle-width-direction inner side intersects the side sill at an intermediate position or a higher position in a height direction of a side surface of the side sill on the vehicle-width-direction inner side.

8. The vehicle body structure for a vehicle according to claim 1, wherein the damping member is configured by an epoxy-based, urethane-based or acrylic-based adhesive, and an additive which is a curing agent, an inorganic filler, an organic filler or a hygroscopic material, added to the adhesive.

* * * * *